(12) United States Patent
Chan et al.

(10) Patent No.: US 7,316,592 B2
(45) Date of Patent: Jan. 8, 2008

(54) ELECTROSTATIC DISCHARGE ENHANCED CHARGE CONTACT DESIGN

(75) Inventors: Chauk Hung Chan, Fanling (HK); Yong Yang Cai, Shanghai (CN); Chu Zhu Pang, Shenzhen (CN)

(73) Assignee: VTech Telecommunications Limited, Tai Po, New Territory (HK)

( * ) Notice: Subject to any disclaimer, the term of this patent is extended or adjusted under 35 U.S.C. 154(b) by 719 days.

(21) Appl. No.: 10/438,988

(22) Filed: May 16, 2003

(65) Prior Publication Data

US 2004/0022388 A1 Feb. 5, 2004

Related U.S. Application Data

(60) Provisional application No. 60/381,949, filed on May 20, 2002.

(51) Int. Cl.
*H01R 13/24* (2006.01)

(52) U.S. Cl. ..................................... 439/824; 200/530
(58) Field of Classification Search ........ 439/824–830, 439/860, 32, 700, 586; 200/530–540
See application file for complete search history.

(56) References Cited

U.S. PATENT DOCUMENTS

| | | | | |
|---|---|---|---|---|
| 529,127 A * | 11/1894 | Lowe | .......................... | 439/739 |
| 3,895,337 A * | 7/1975 | Osawa | ........................ | 337/126 |
| 3,934,104 A * | 1/1976 | Stout | .......................... | 200/532 |
| 4,316,304 A | 2/1982 | Parise et al. | | |
| 4,417,115 A * | 11/1983 | Desmarais et al. | ......... | 200/517 |
| 5,052,484 A * | 10/1991 | Gesta | .......................... | 166/55 |
| 5,063,611 A * | 11/1991 | Kitabayashi | ................ | 455/348 |
| 5,463,198 A * | 10/1995 | Shimaoka | .................... | 200/531 |
| 5,625,177 A * | 4/1997 | Yukinori et al. | ............ | 200/1 R |
| 5,631,959 A * | 5/1997 | Messina et al. | ........ | 379/428.01 |
| 6,565,395 B1* | 5/2003 | Schwarz | ..................... | 439/840 |
| 6,932,620 B2* | 8/2005 | Ishiguro et al. | ............... | 439/66 |
| 2005/0057404 A1* | 3/2005 | Demicco et al. | ............ | 343/702 |
| 2005/0070171 A1* | 3/2005 | Zheng et al. | ............... | 439/700 |
| 2006/0281370 A1* | 12/2006 | Mahoney et al. | ........... | 439/700 |

FOREIGN PATENT DOCUMENTS

GB 834754 A 5/1960
GB 1397460 A 6/1975

OTHER PUBLICATIONS

Great Britain Search Report (Oct. 28, 2003).

* cited by examiner

*Primary Examiner*—Briggitte Hammond
*Assistant Examiner*—Larisa Tsukerman
(74) *Attorney, Agent, or Firm*—Paul Hastings Janofsky & Walker, LLP

(57) ABSTRACT

The present invention is directed to an electrical contact that incorporates a movable metal connection component such as a contact pin. The metal connection component is mounted within an insulating body. An electrically conducting path, from a contact head of the metal connection component to an interior of a base chassis is created only when a handset has been positioned within a cradle cavity of the base.

10 Claims, 14 Drawing Sheets

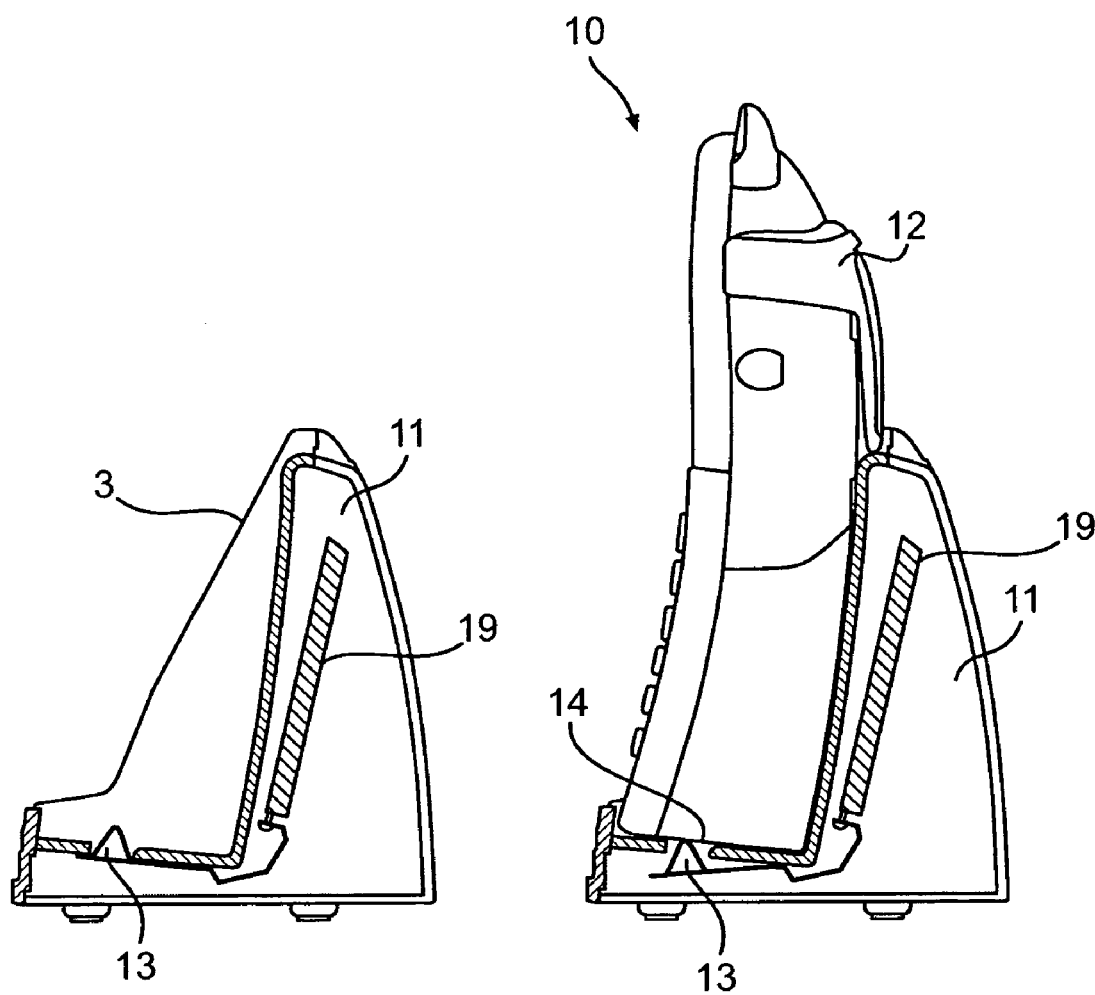
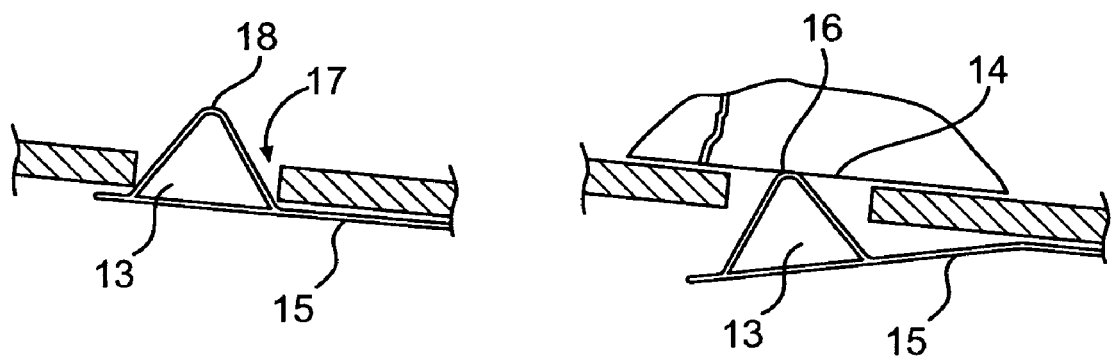
FIG. 1
KNOWN ART

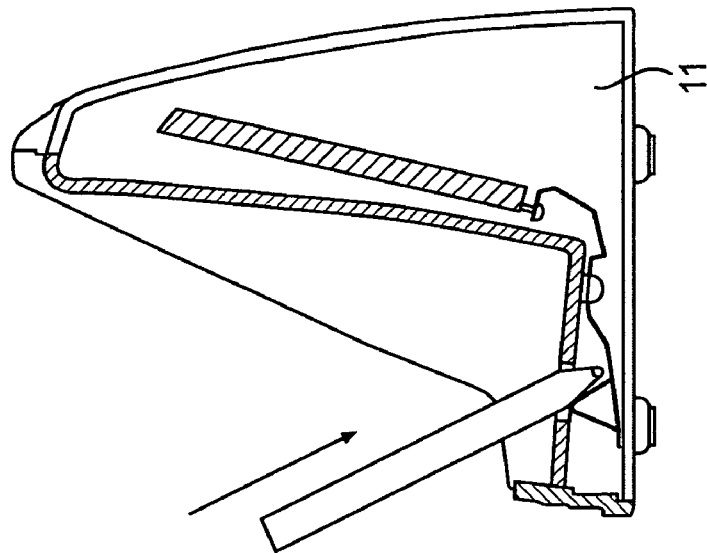
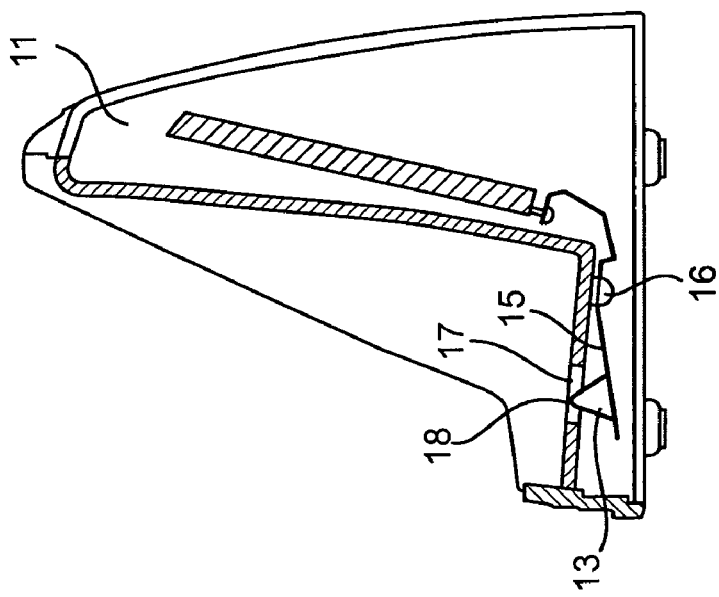
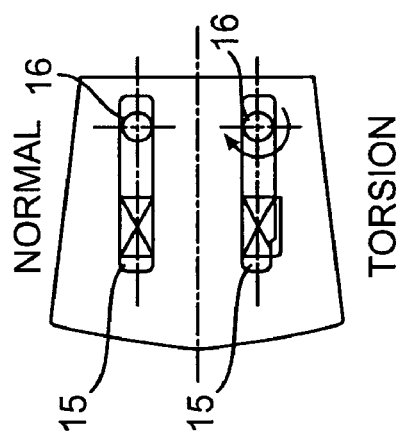
FIG. 2
KNOWN ART

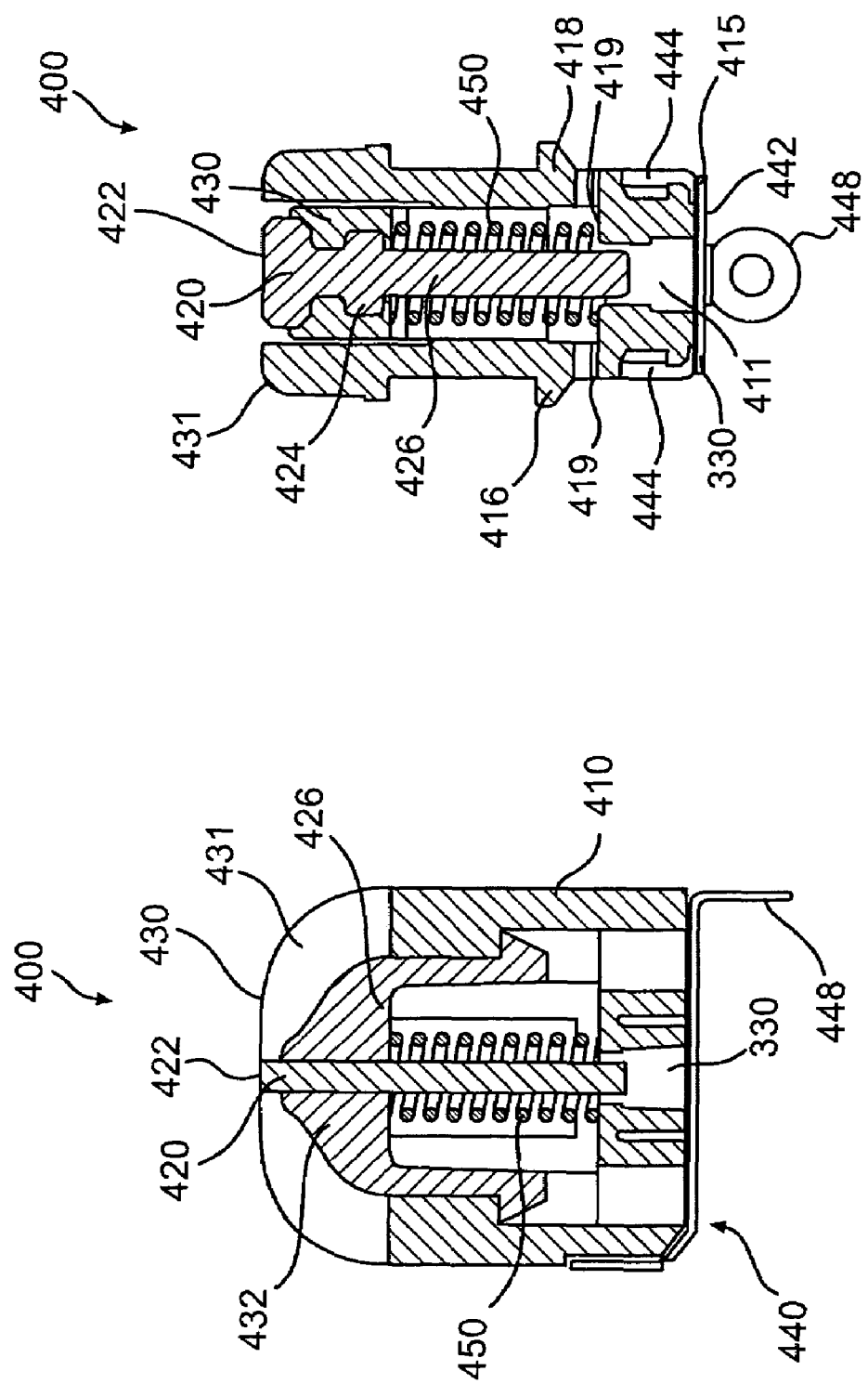

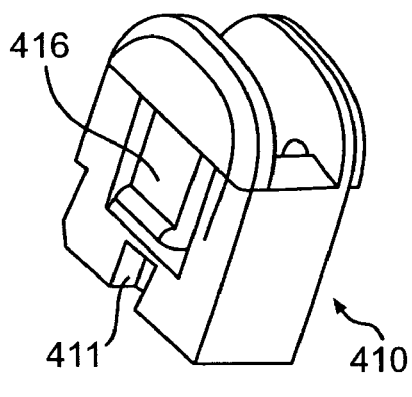 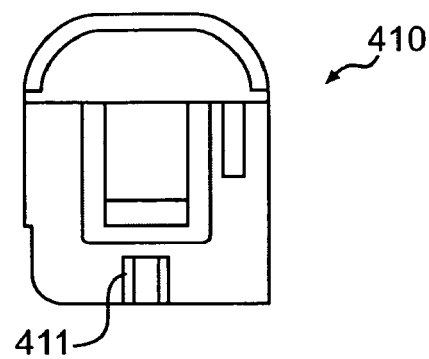
FIG. 9  FIG. 10
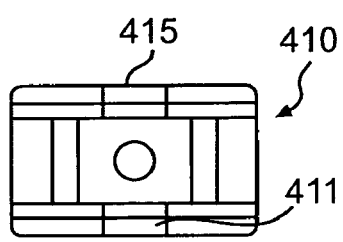 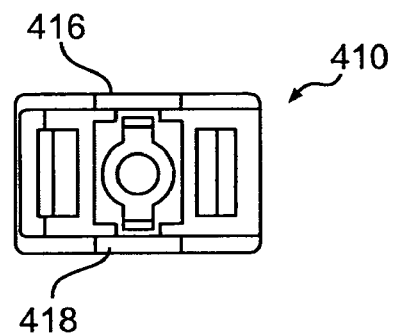
FIG. 11  FIG. 12
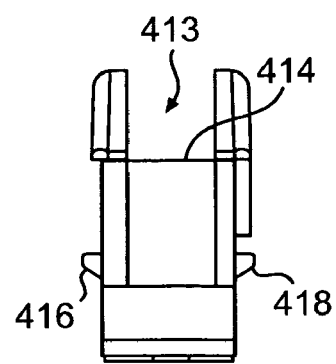
FIG. 13

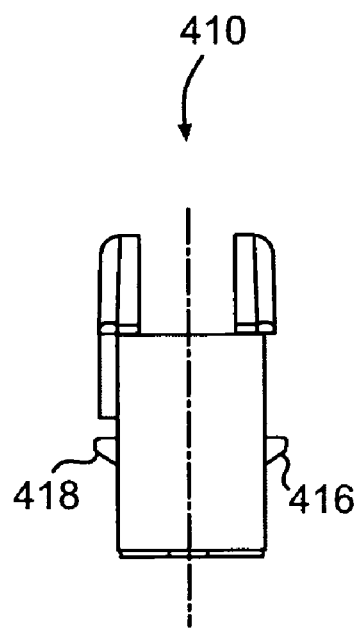
FIG. 14
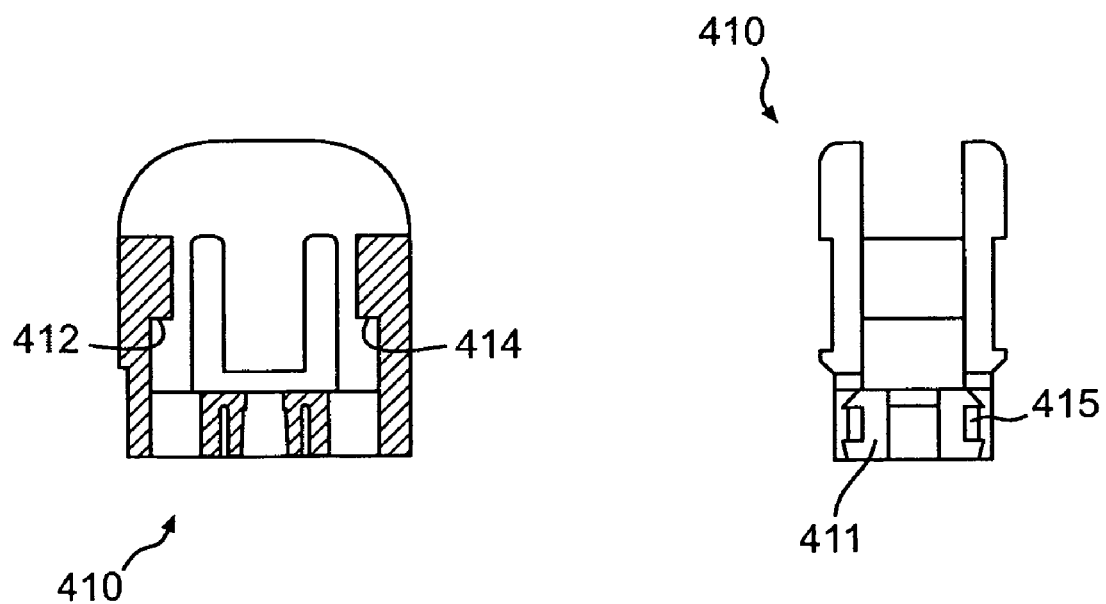
FIG. 15  FIG. 16

ELECTROSTATIC DISCHARGE ENHANCED CHARGE CONTACT DESIGN

CROSS-REFERENCE TO RELATED APPLICATION

This application claims the benefits of U.S. Provisional Patent Application No. 60/381,949 filed on May 20, 2002, which is incorporated herein by reference in its entirety.

BACKGROUND OF THE INVENTION

1. Field of the Invention

The present invention relates generally to electrical contact constructions and, more particularly, to electrical contact constructions for cordless telephone handset apparatus.

2. Background of the Invention

FIG. 1 is a schematic diagram showing a known cordless telephone. Conventional cordless telephone 10 includes base unit 11 and handset 12. The left half of FIG. 1 shows base unit 11 without handset 12 placed within it. The right half of FIG. 1 shows handset 12 rested within base unit 11.

Base unit 10 includes battery charging equipment 19 and a cradle cavity that is configured to receive handset 12. The cradle cavity has electrical contacts 13 that are suitably disposed within the cradle cavity, so that upon placement of handset 12 in the cradle cavity, electrical contacts 13 physically come into contact with corresponding electrical contacts 14 of handset 12. Battery charging equipment 19 in base unit 11 (and possibly, in handset 12) is then activated to supply current to the battery in handset 12 to recharging the battery.

In many such handset constructions, electrical contacts 14 in the bottom portion of handset 12 are continuously coupled electrically with the internal electrical circuitry (not shown) of handset 12. Because of this construction, it is often possible that during the use of handset 12, the operator, and, in turn, handset 12, may acquire a substantial static electrical charge. During the act of placing handset 12 into the cradle cavity of base unit 11, a substantial electrostatic discharge (ESD) may occur due to the static energy that is discharged from handset 12 and/or the operator, into base unit 11. The discharge may result in damage to the circuitry in either or both of handset 12 and base unit 11.

Accordingly, known cordless telephone constructions have typically required the presence of special circuitry within base unit 11 to dissipate or otherwise address the electrical energy of a discharge to protect the functional circuitry of telephone 10. Such protective circuitry or other structures (mechanical and/or electrical) often significantly add to the complexity and cost, as well as the physical size, of the telephone components.

In addition, the charging contacts in base unit 11 of handset 12 need to have a spring-action interface between contacts 13 of base unit 11 and electrical contacts 14 of handset 12. The spring-action interface enables contacts 13 to be kept in continuous contact with handset contacts 14. The spring-action interface also permits contacts 13 themselves to be moved to address the clearance between the cradle cavity of base unit 11 and handset 12.

Contacts 13 apply a spring force exerted by thin sheet of metal 15. Thin sheet of metal 15 can be, for example, about 0.15 mm thick. Preferably, thin sheet of metal 15 is made of a phosphorous bronze, nickel-plated sheet. Thin sheet of metal 15 supports contacts 13 at one end and is connected to the interior of base unit 11 at the other end. Metal sheet 15 provides for an elastic reciprocal travel within a controlled travel stroke. Metal sheet 15 may well be durable enough for the service life of telephone 10. Nevertheless, there may exist non-uniformities in the spring force of individual charge contacts due to various fabrication and quality control issues.

Such thin sheet metal construction for known resilient contact support structures leads to a relatively non-robust element. Handling during manual fabrication processes may compound irregularities in initial deformation. In addition, such thin sheet metal elements may complicate the assembly process, increasing the assembly time and assembly costs.

Such thin sheet metal contact supports are typically attached to base unit 11 by screw fasteners 16 (see FIG. 2), which may exert forces on metal sheet 15 that may skew the alignment of charge contacts 13 within its chassis aperture, such that contacts 13 may require adjustment on a potentially individualized basis (see left half of FIG. 2). Such known contacts are also susceptible to misalignment due to operator misuse, or attempts to clean the charge contacts with a pen (see right half of FIG. 2).

A typical known electrical contact construction incorporates metal contact head 18 that is a protrusion that leans through opening 17 in base unit 11. This construction requires clearance between contact head 18 and the chassis to prevent contact head 18 from being stuck because of frictional force, in case contact head 18 rubs against the base chassis. The light spring force available in thin sheet metal 15 may not be adequate to ensure that in the event of such frictional contact between contact head 18 and the chassis, contact head 18 will be reliably pushed back up through aperture 17 in the chassis, to the specified position. To avoid imposition of such frictional forces, a visible gap may be created that may permit the penetration of liquid, dust, etc. Such a gap may become even more pronounced if/when the electrical contact becomes misaligned. Damage and premature degradation of base unit 11 may be a result.

In addition, a contact for a base unit for a cordless telephone should be robust enough to resist and withstand a certain amount of possible abuse by the owner.

Accordingly, there is a need for an electrical contact construction that may be employed in the environment of a cordless telephone handset and a base unit, as well as in other environments, in which the electrical contacts have an improved design that provides a degree of protection against damage through the propagation of a static electrical discharge.

Furthermore, it would also be desirable to provide an electrical contact construction that is provided with a robust design to provide for a reliable operation over an expected life cycle of the telephone.

Moreover, it would be desirable to provide an electrical contact construction that has an advantageous ease of assembly.

These and other desirable characteristics of the invention will become apparent in light of the present specification and drawings.

SUMMARY OF THE INVENTION

One embodiment of the invention is an electrical contact that reduces electrostatic discharge in electronic devices. The electrical contact includes a contact head, a contact pin, a body, a electrical connection plate, and a spring. The contact head is made of a nonconductive material. The contact pin is made of a conductive material. The contact pin includes a top end, a stem, and a terminal point. The contact pin is embedded within the contact head so as to provide an electrical path from the top end to the terminal point. The body is made of a nonconductive material. The body is configured to receive the stem and the terminal point within a cavity of the body. The electrical connection plate is attached to a bottom portion of the body. The spring surrounds the stem of the contact pin. The spring is disposed within the body such that an air gap exists between the electrical connection plate and the terminal point of the contact pin when the spring is uncompressed.

Preferably, the contact head further includes one or more legs. Preferably, the contact head further includes a foot on each of the one or more legs. Preferably, the contact head further includes a bridging portion, and the contact pin is disposed within the bridging portion. Preferably, the contact pin further includes one or more lateral projections. The one or more lateral projections of the contact pin are embedded within the contact head. Preferably, the spring is disposed between a rigid surface of body and the contact head. Preferably, the contact pin touches the electrical connection plate when the spring is compressed by a force exerted on the top end of the contact pin. Preferably, the electrical connection plate further includes one or more ears configured to attach the electrical connection plate to the body.

Another embodiment of the invention provides a base of an electronic device. The base includes an internal circuit and an electrical contact. The electrical contact includes an electrical connection plate and a contact pin. The electrical connection plate is electrically connected to the internal circuit. The contact pin is configured to move between a first position and a second position. In the first position, the contact pin is electrically separated from the electrical connection plate by an air gap. In the second position, the contact pin touches the electrical connection plate.

Preferably, the electrical contact further includes a spring. The spring is configured to maintain the contact pin in the first position when the spring is in an uncompressed state. Preferably, the spring is further configured to be compressed by a force exerted on a top end of the contact pin to move the contact pin from the first position to the second position. Preferably, the electrical contact further includes one or more prongs. Preferably, the base further includes one or more side apertures that are configured to receive the one or more prongs of the electrical contact.

In another embodiment, the invention provides a cordless telephone that includes a handset, a base unit, and an electrical contact. The handset has a contact point at a bottom portion of the handset. The base unit has an internal circuit configured to be electrically connected to the contact point when the handset is rested within a cradle cavity of the base unit. The electrical contact is attached to the cradle cavity. The electrical contact includes a contact pin, a spring, and an electrical connection plate. The electrical connection plate is electrically connected to the internal circuit of the base unit. The spring maintains an air gap between the contact pin and the electrical connection plate when the handset is not in the cradle cavity. When the handset is placed in the cradle cavity, the contact point touches the contact pin and the handset compresses the spring so that the contact pin touches the electrical connection plate.

Preferably, the electrical contact further includes a contact head and a body. Preferably, the contact head and the body are made of a nonconductive material. Preferably, the contact pin is embedded within the contact head such that a top end of the contact pin is exposed above the contact head to enable electrical connection between the contact pin of the electrical contact and the contact point of the handset. Preferably, the contact pin further includes a stem. Preferably, the spring surrounds the stem.

BRIEF DESCRIPTION OF THE DRAWINGS

FIG. 1 is a schematic diagram showing a conventional cordless telephone and its electrical contact design.

FIG. 2 is a schematic diagram showing potential drawbacks of the conventional electrical contact arrangement.

FIG. 7 is a front cross-section view of electrical contact 400.

FIG. 8 is a right-side cross-section view of electrical contact 400.

FIG. 9 is a schematic diagram showing a perspective view of body 410 according to a preferred embodiment of the invention.

FIG. 10 is a front elevation view of body 410.

FIG. 11 is a top plan view of body 410.

FIG. 12 is a bottom view of body 410.

FIG. 13 is a right-side elevation view of body 410.

FIG. 14 is a left-side elevation view of body 410.

FIG. 15 is a front cross-section view of body 410, taken along line CEN-CEN shown in FIG. 14.

FIG. 16 is a right-side cross-section view of body 410, taken along line B-B shown in FIG. 15.

DETAILED DESCRIPTION OF THE DRAWINGS

Figure 3:
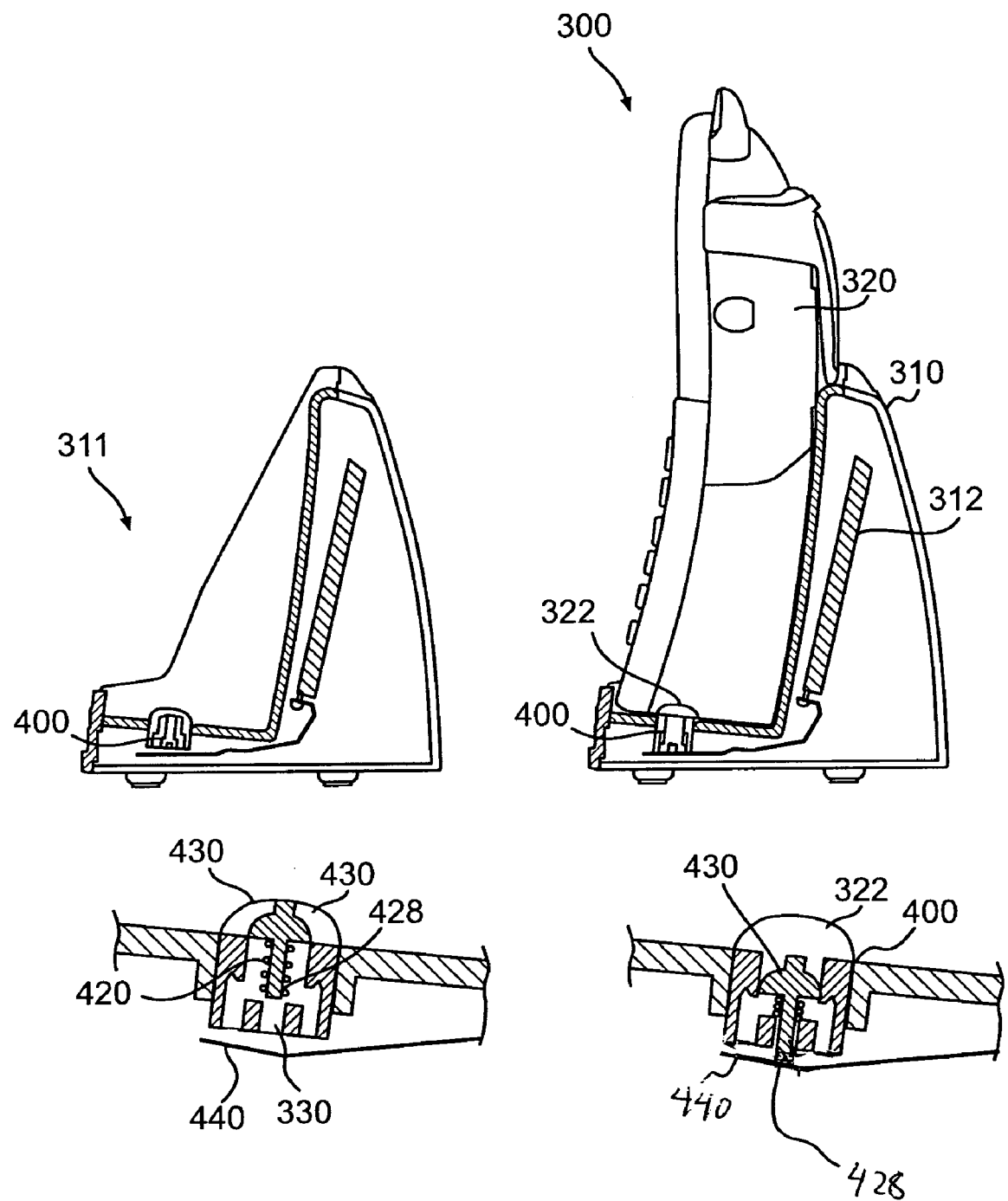
FIG. 3 is a schematic diagram showing a preferred embodiment of the invention in which cordless telephone 300 includes electrical contact 400 of the invention.

While this invention is susceptible of embodiment in many different forms, there is shown in the drawings and will be described herein in detail, a specific embodiment, with the understanding that the present invention is to be considered as an exemplification of the principles of the invention and is not intended to limit the invention to the embodiment illustrated.

The preferred embodiment of the invention is directed to an electrical contact construction. The electrical contact incorporates a movable metal connection component. The moveable component is resiliently mounted within an insulating body. In the context of an electronic device (e.g., a cordless telephone) that includes a portable unit (e.g., the handset) and base (e.g., the base unit of the cordless telephone), the electrical contact of the invention can be incorporated, e.g., as a component of the base. An electrically conducting path from a contact head of the electrical contact to the interior of the base is created only when the portable unit has been positioned within the base.

Preferably, the present invention can include an integrated ON/OFF switch within a single compact device. For example, when a handset of a cordless telephone is placed fully or substantially fully down on and within a cradle cavity of a base unit of the cordless telephone, the weight of the handset pushes the contact device into the "ON" or electrically conducting configuration. In the open configuration or the "OFF" position, the handset is either absent from the base unit, or the handset is only slightly touching such that the contact is not fully depressed. In the "OFF" position, an air gap exists within the contact assembly itself, creating an "open circuit" condition. The open circuit condition tends to reduce the likelihood of an electrostatic discharge from occurring. At the least, the open circuit condition requires the charge to cross the air gap, and dissipating, at least in part, through ionization of the air in the air gap, in the process of the discharge.

To the extent that any numerical values, metallurgical compositions or other specific technical details are provided in the figures or in the description, they are given by way of example and the present invention is not intended to be limited thereto, as one of ordinary skill in the art, having the present disclosure before them, will be able to make modifications and variations in the invention, without departing from the scope of the invention.

FIG. 3 is a schematic diagram showing cordless telephone 300 that includes a preferred embodiment of electrical contact 400 of the invention. Cordless telephone 300 includes base unit 310 and handset 320. Base unit 310 includes electrical contact 400 at the bottom of cradle cavity 311. In the non-operating condition (first position) shown on the left side of FIG. 3, contact pin 420 (more clearly shown in FIG. 4) is separated from electrical connection plate 440 (more clearly shown in FIG. 4) by air gap 330. In the charging condition (second position) shown on the right side of FIG. 3, terminal point 428 (more clearly shown in FIG. 4) of contact pin 420 is in contact with electrical connection plate 440 and there is no air gap. Thus, in the non-operating condition shown on the left side of FIG. 3, circuit 312 of base unit 310 is "open." On the other hand, circuit 312 is "closed" in the charging condition shown on the right side of FIG. 3. Although the preferred embodiment includes electrical contact 400 as part of base unit 410, modification can be made so that electrical contact 400 can be included as part of handset 320.

Preferably, air gap 330 can be calibrated to be about 2 mm. The 2 mm air gap can defend 2 KV. In other words, circuit 312 can bear about 2 KV of electrostatic discharge or Hi-Pot (High Potential) test. Preferably, contact head 430 moves down about 3.4 mm to press and touch electrical connection plate 440 when handset 320 is put in cradle cavity 311 of base unit 310. Handset 320 is electrically connected, via contact point 322, to circuit 312, via electrical connection plate 440, when firmly placed in cradle cavity 311.

Figure 4:
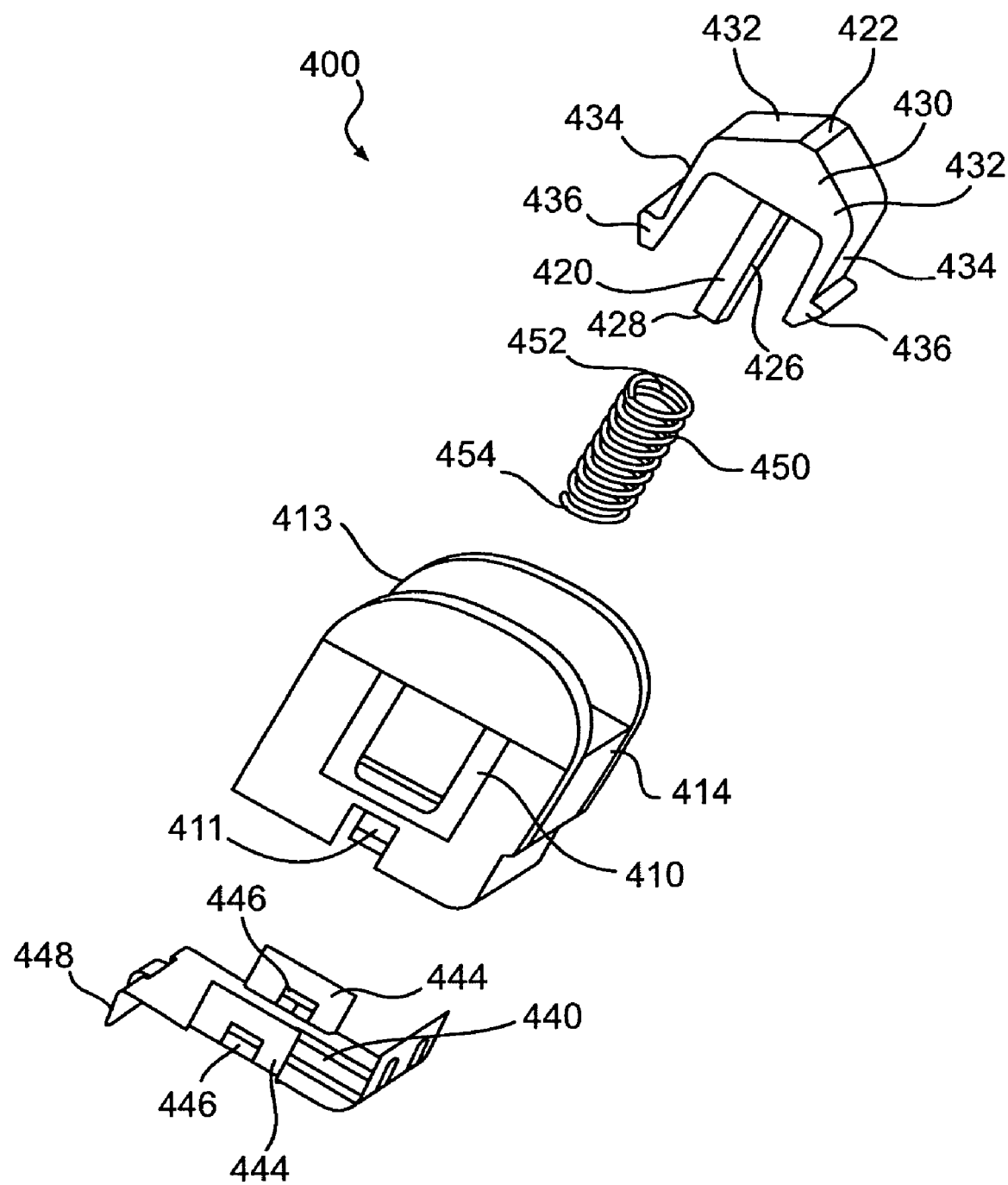
FIG. 4 is a schematic diagram showing a perspective, exploded view of electrical contact 400 according to a preferred embodiment of the invention.
Figure 6:
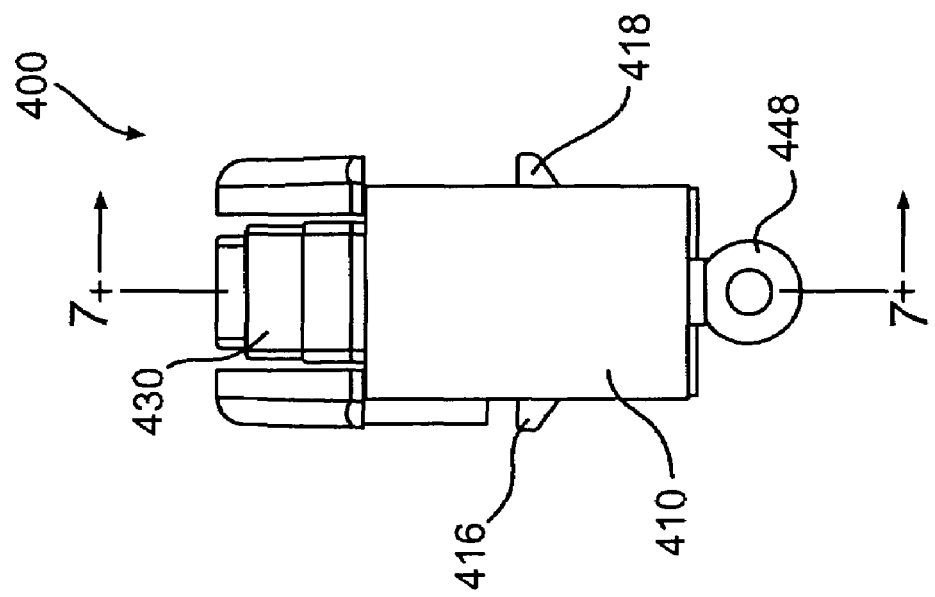
FIG. 6 is a right-side elevation view of assembled electrical contact 400.
Figure 5:
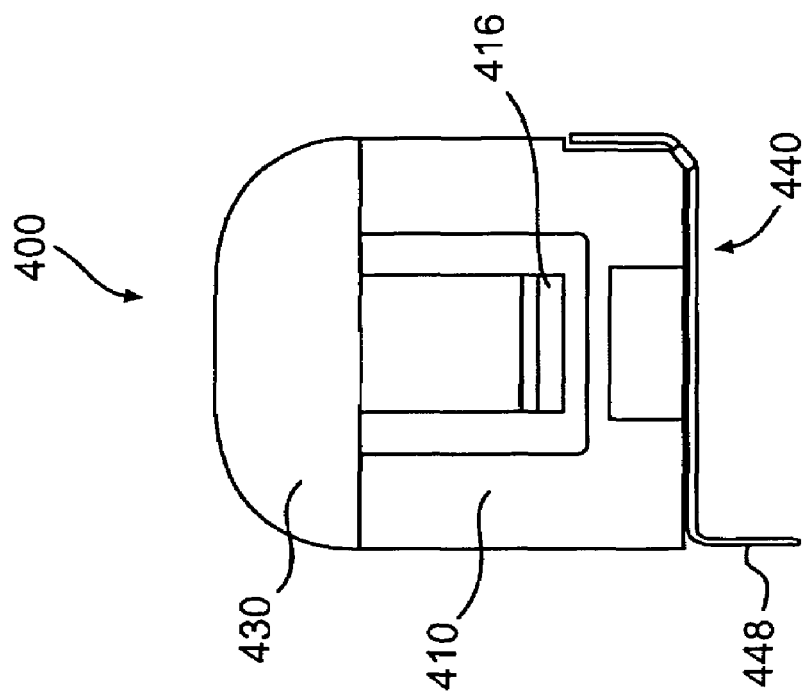
FIG. 5 is a front elevation view of electrical contact 400, which is shown in its assembled configuration.

As shown in FIG. 4, electrical contact 400 includes body 410, contact pin 420, contact head 430, electrical connection plate 440, and spring 450. When fully assembled as shown in FIGS. 5, 6, 7, and 8, contact pin 420 is surrounded by spring 450. When assembled, contact pin 420 and spring 450 are located within cavity 413 of body 410. FIGS. 7 and 8 indicate that substantially the entire length of stem 426 of contact pin 420 is surrounded by spring 450. As shown in FIGS. 7 and 8, top end 422 of contact pin 420 is embedded within bridging portion 432 of contact head 430. Preferably, contact pin 422 includes one or more lateral projections 424 to provide additional friction between top end 422 and bridging portion 432. As shown in FIGS. 8 and 9, top end 422 is exposed on top surface 431 of contact head 430. Top surface 431 guides the positioning of the handset on the base, by providing "pin and hole" relationship, and secures the alignment of the handset and the base. A width of top surface 431 can be designed so that an artificial finger, which is a steel rod having a rounded end, of the UL Hi-Pot test cannot push contact head 430 so as electrical connection cannot be established with the internal circuitry. Air gap 330 between contact pin 410 and electrical connection plate 440 prevents arcing. Further, top surface 431 can withstand a force exerted by the artificial finger during the Hi-Pot test.

FIGS. 9, 10, 11, 12, 13, 14, 15, and 16 depict different views of body 410. Preferably, body 410 is fabricated from an electrically insulating material. For example, body 410 can be made of a suitable plastic material. Other electrically insulating materials may be used.

Body 410 includes left shoulder 412 (see FIG. 15), cavity 413 (see FIG. 13), right shoulder 414 (see FIG. 15), front outwardly projecting biased prong 416 (see FIG. 13), rear outwardly projecting biased prong 418 (see FIG. 13), front minor barb 411 (see FIG. 10), and rear minor barb 415 (see FIG. 16). Front minor barb 411 and front prong 416 are located on one side of body 410 (e.g., the front side), while rear minor barb 415 and prong 418 are located on the opposite side of body 410 (e.g., the rear side). Cavity 413 is surrounded by prongs 416, 418 and shoulders 412, 414.

Figure 17:
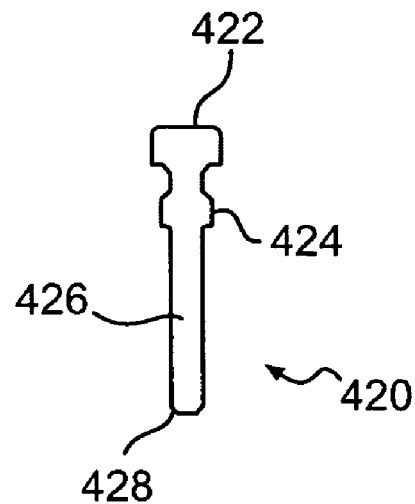
FIG. 17 is a schematic diagram showing a side elevation view of contact pin 420 according to a preferred embodiment of the invention.
Figure 18:
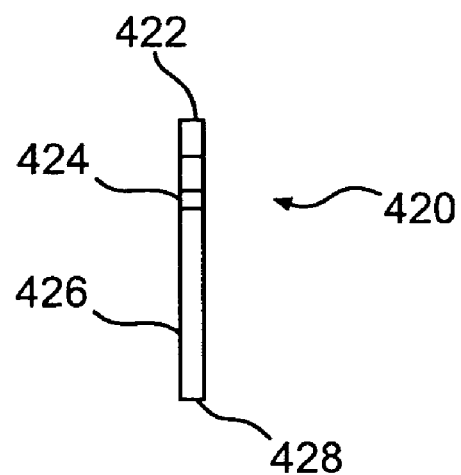
FIG. 18 is a front elevation view of contact pin 420.
Figure 19:
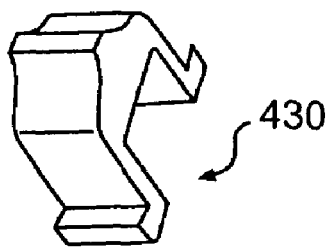
FIG. 19 is a schematic diagram showing a perspective view of contact head 430 according to a preferred embodiment of the invention.
Figure 23:
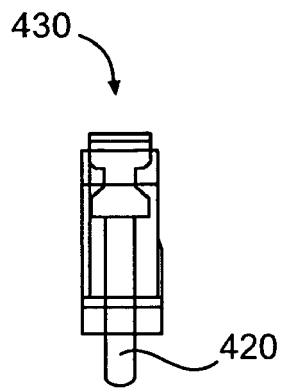
FIG. 23 is a right-side elevation view of contact head 430.
Figure 24:
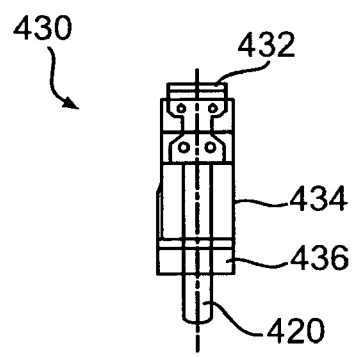
FIG. 24 is a left-side cross-section view of contact head 430.
Figure 25:
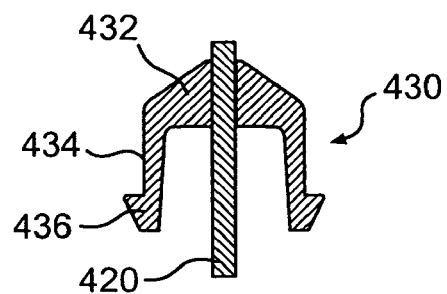
FIG. 25 is front cross-section view of contact head 430, taken along line SIDE-SIDE shown in FIG. 24.

Contact pin 420 is electrically conductive. Contact pin 420 is preferably fabricated from a conductive material, such as a metal or an alloy. For example, contact pin 420 is preferably made of copper with gold plating. Preferably, the material is about 0.8 mm copper with about 3 microns copper plus about 5 microns gold plating. Other materials may be employed. As shown in FIGS. 17 and 18, a preferred embodiment of contact pin 420 is elongated with top end 422, stem 426, and terminal point 428. Top end 422 preferably has a T-shape as indicated in FIG. 17 and FIG. 23. Preferably, contact pin 420 includes one or more lateral projections 424. Stem 426 is about the same length as spring 450 when spring 450 is not compressed. Preferably, contact pin 420 is free from burrs and grease.

Figure 20:
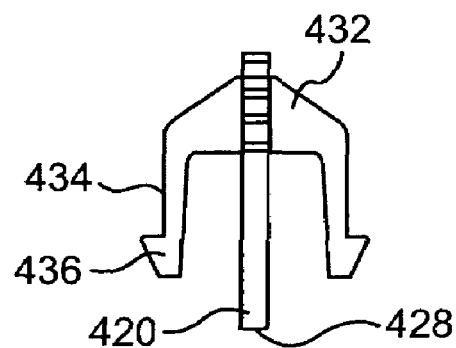
FIG. 20 is a front elevation view of contact head 430.
Figure 21:
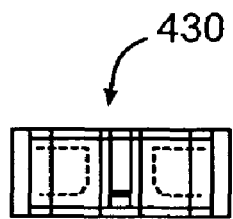
FIG. 21 is a top plan view of contact head 430.
Figure 22:
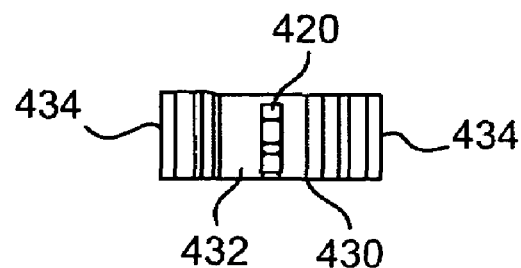
FIG. 22 is a bottom view of contact head 430.

As shown in FIG. 20, contact head 430 includes shoulder 431, bridging portion 432, a pair of legs 434, and a pair of outwardly extending feet 436. Legs 434 are extended from bridging portion 432. Each leg 434 includes an outwardly extending foot 436. Bridging portion 432, legs 434, and feet 436 are preferably an integrated unit. For example, these components can be molded as an unitary piece. Preferably, contact head 430 is flexible or resilient such that feet 436 can move closer to each other when they are squeezed or pressed toward each other, and when the pressure is released, feet 436 moves away from each other to resume the position indicated in FIG. 20.

Preferably, contact head 430 holds top end 422 firmly. Preferably, one or both top end 422 and laterally projections 424 are embedded within bridging portion 432. Stem 426 extends downwardly below feet 436. As shown in FIG. 20, terminal point 428 is located at an elevation lower that those of feet 436.

Figure 26:
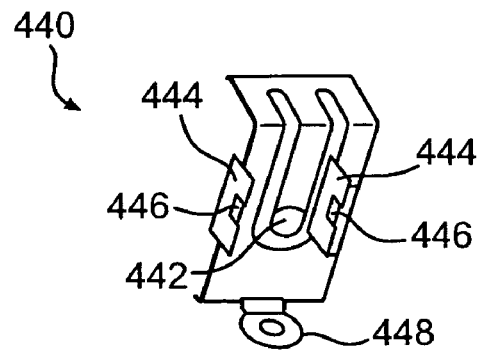
FIG. 26 is a schematic diagram of a perspective view of electrical connection plate 440 according to a preferred embodiment of the invention.
Figure 27:
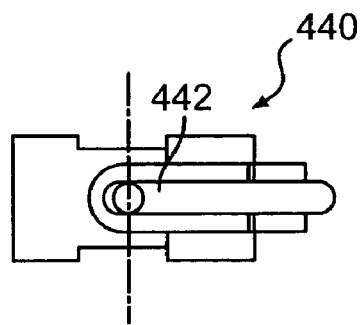
FIG. 27 is a top plan view of electrical connection plate 440.
Figure 28:
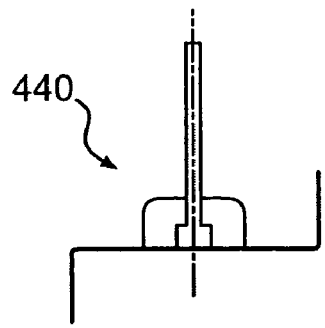
FIG. 28 is a front elevation view of electrical connection plate 440.
Figure 29:
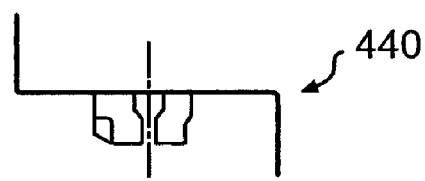
FIG. 29 is a rear elevation view of electrical connection plate 440.
Figure 30:
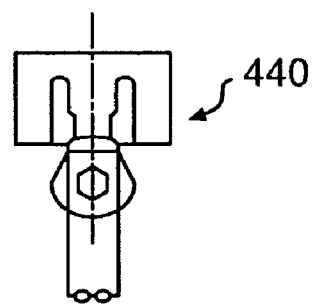
FIG. 30 is a right-side elevation view of electrical connection plate 440.
Figure 31:
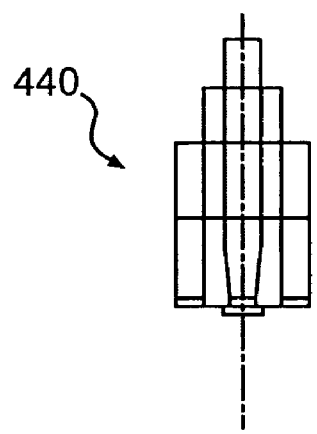
FIG. 31 is a left-side elevation view of electrical connection plate 440.

As shown in FIG. 26, electrical connection plate 440 includes resiliently configured connection portion 442, a pair of ears 444, openings 446, and tail 448. Electrical connection plate 440 is preferably configured to be connected to a bottom portion of body 410. Terminal point 428 of contact pin 420 moves into contact with resiliently configured connection portion 442. Connection portion 442 preferably has sufficient length and resiliency to permit the accommodation of some variance as to the amount of movement of contact pin 420 and contact head 430, relative to body 410, upon receipt of handset 320 by base unit 310. Tail 448 is provided to serve as an ultimate electrical connection for the contact assembly.

Preferably, electrical connection plate 440 is free from burrs and grease. Preferably, the material for plate 440 is phosphorous bronze that is about 0.2 mm thick with about 3 microns copper plus about 5 microns of nickel plating.

Figure 32:
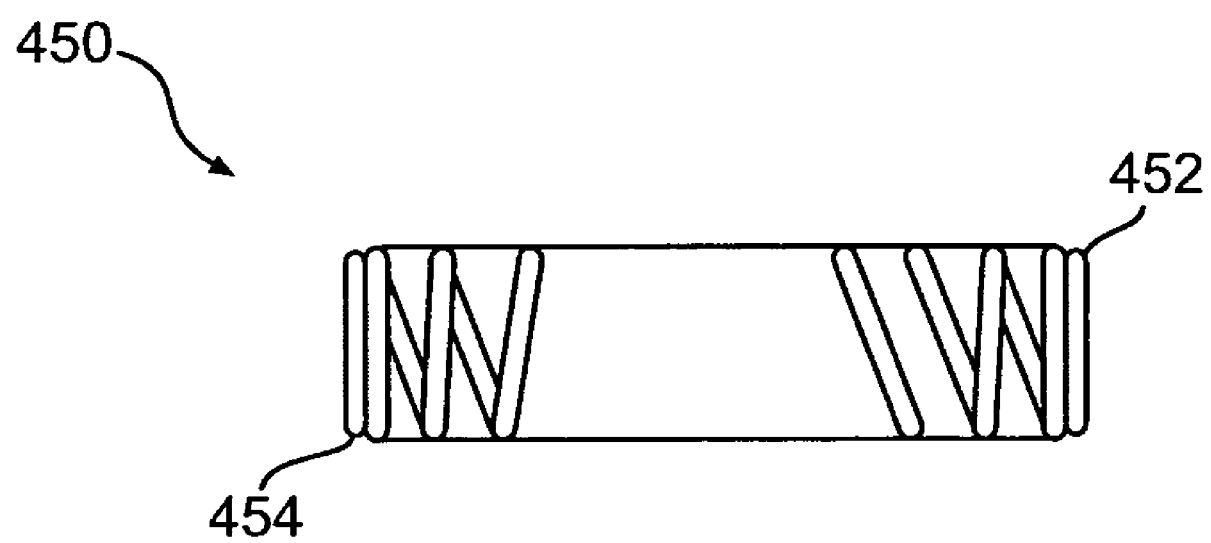
FIG. 32 is a fragmentary side elevation view of spring 450 according to a preferred embodiment of the invention.

As shown in FIG. 32, spring 450 includes top end 452 and bottom end 454. Preferably, when spring 450 is in its uncompressed or natural state, the distance between top end 452 and bottom end 454 is about the same as the length of stem 426. Spring 450 is provided to surround elongated stem 426 of contact pin 420.

Preferably, distance "L" shown in FIG. 32 is the natural distance which is decided by a vendor of spring 450. Preferably, the working travel distance is from about 2.0 mm to about 5.4 mm. Preferably, TEH working force at 5.4 mm is about 5 g. Preferably, TEH working force at 2 mm is about 15 g. Preferably, the maximum travel point is about 2 mm. The most spring 450 can be compressed or shortened, is about 3.4 mm. The diameter of spring 450 is preferably about 2 mm. The diameter of the wire that forms spring 450 is preferably between about 0.16 mm to about 0.2 mm.

To assemble the various components of electrical contact 400 depicted in FIG. 4 into the assembled electrical contact 400 depicted in FIGS. 5, 6, 7, and 8, the following steps may be followed.

First, spring 450 is sleeved over stem 426. In this manner, as shown in FIGS. 7 and 8, spring 450 surrounds tip 420 so that upper end 452 of spring 450 comes into contact with a bottom surface of bridging portion 432 and lower end 454 of spring 450 is located near terminal point 428 of contact pin 420.

Then, contact head 430 is pushed into cavity 413 of body 410. This can be done by pushing or squeezing feet 436 toward each other and then guiding them into cavity 413. Bridging portion 423 can then be pushed in a downwardly motion so that legs 434 moves further down into cavity 413. Once feet 436 pass shoulders 412, 414 of body 410, the potential energy that is stored in legs 434 due to previous squeezing of feet 436 causes feet 436 to return to their normal positions, which is further apart from each other than when there were being pushed through shoulders 412, 414.

The separation of feet 436 from each other at points below shoulders 412, 414 prevents the removal of contact head 430 due to the interference of feet 436 with shoulders 412, 414.

Next, electrical connection plate 440 is pressed onto the bottom of body 410. This can be accomplished by aligning ears 444 over minor barbs 411, 415. As electrical connection plate 440 is pushed in an upwardly motion ears 444 pass over minor barbs 411, 415. Barbs 411, 415 then become captured in openings 446 of ears 444 to keep electrical connection plate 440 held against the bottom of body 410.

The interior of body 410 is appropriately configured so that bottom end 454 of spring 450 bears against an interior, plastic or other non-conducting surface 419 of body 410 (see FIG. 8), preventing terminal point 428 of contact pin 420 from touching connection portion 442 of electrical connection plate 440. As shown in FIGS. 7 and 8, air gap 330 exists between terminal point 428 and connection portion 442 in the configuration (the first position) illustrated. Unless contact head 430 is pushed further down (the second position) into body 410 (e.g., due to the weight of handset 320), air gap 330 exists due to the potential energy that is stored in spring 450.

Accordingly, any electrical static discharge that might "jump" from contact point 322 of handset 320 would not only have to leap the gap from handset 320 to top end 422 of contact pin 420, but also air gap 330 that exists between terminal end 428 of contact pin 420 and connection portion 442 of electrical connection plate 440. Moreover, even once physical contact between handset 320 and top end 422 of contact pin 420 has been made, static discharge is still made less potentially damaging, due at least in part to the persistence of interior air gap 330, until sufficient depression of contact head 430 into body 410 has occurred.

Once assembly of electrical contact 400 has been completed (see FIGS. 5, 6, 7, and 8), it can be pushed through a suitably shaped opening or cradle cavity 311 in the chassis of base unit 310. Base unit 310 is provided with side apertures that receive and engage prongs 416, 418 and prevent removal of electrical contact 400. "Press Fit" tolerance dimensions would be all that would be required. Because the lower outer portions of electrical contact 400 do not move with respect to the chassis of base unit 310, there is less gap that can occur, thus providing further protection against undesired intrusion of contaminants into the interior of base unit 310.

The present invention provides several advantageous features. For example, contact head 430 and contact pin 420 form a rigid solid part that is more robust than the cantilevered weak leaf spring design of prior art contacts. Further, since contact head 430 and contact pin 420 form a rigid solid part, a conductive surface of the contact pin can be cleaned without damaging electrical contact 400, thus extending the life of the device. Furthermore, the simplicity of contact pin 420 facilitates the plating process. Preferably, contact pin 420 is about 0.8 mm thick copper, and can be electroplated by a barrel plating process which lends itself to economical mass-production. The use of the coil spring 450 gives a designer considerable flexibility in determining the desired amount of spring force that the contact will employ. By advantageous selection of the wire material and diameter, and overall spring diameter and other dimensions, a fairly accurate amount of control over the spring performance, and with reduced variation from spring to spring, can be achieved. Spring 450 maintains electrical contact 400 in an open circuit configuration, that helps discourage electrostatic discharge and, by virtue of internal air gap 330, helps to cause the dissipation of charge. In the event the electrostatic discharge does occur, it is dissipated before the current can reach the internal circuitry 312 of base unit 310.

The invention also minimizes the visible gap or clearance between the base unit charge contact and the chassis, thus improving the appearance of the product. The invention also provides a more robust and reliably assembled product. Deformation of the electrical and moving components during assembly is reduced. The invention further provides a degree of protection against electrostatic discharge. The contact assembly is provided so that it can be snapped into a suitable aperture in a base chassis, thus eliminating the use of a deforming screw fastener. In addition, the invention results in reduction in assembly costs and production time.

The foregoing disclosure of the preferred embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. An electrical contact for reducing electrostatic discharge comprising:
   a contact head made of a nonconductive material;
   a contact pin made of a conductive material, the contact pin comprising a top end, a stem, and a terminal point, wherein the contact pin is embedded within the contact head so as to provide an electrical path from the top end to the terminal point;
   a body made of a nonconductive material, wherein the body is configured to receive the stem and the terminal point within a cavity of the body, wherein the contact head further comprises one or more legs and a foot on each of the one or more legs;
   an electrical connection plate attached to a bottom portion of the body; and
   a spring surrounding the stem of the contact pin, wherein the spring is disposed within the body such that an air gap exists between the electrical connection plate and the terminal point of the contact pin when the spring is uncompressed.

2. The electrical contact of claim 1, wherein the contact head further comprises a bridging portion, wherein the contact pin is disposed within the bridging portion.

3. The electrical contact of claim 1, wherein the electrical connection plate further comprises one or more ears configured to attach the electrical connection plate to the body.

4. The electrical contact of claim 1, wherein the contact pin further comprises one or more lateral projections.

5. The electrical contact of claim 4, wherein the one or more lateral projections of the contact pin are embedded within the contact head.

6. The electrical contact of claim 1, wherein the spring is disposed between a rigid surface of body and the contact head.

7. The electrical contact of claim 6, wherein the contact pin touches the electrical connection plate when the spring is compressed by a force exerted on the top end of the contact pin.

8. The electrical contact of claim 1, wherein the electrical contact forms part of a base of an electronic device comprising an internal circuit.

9. The electrical contact of claim 8, wherein the electrical contact further comprises one or more prongs.

10. The electrical contact of claim 9, the base further comprising one or more side apertures configured to receive the one or more prongs of the electrical contact.

* * * * *